(12) United States Patent
Manfredotti et al.

(10) Patent No.: US 8,876,091 B2
(45) Date of Patent: Nov. 4, 2014

(54) INSULATING COATING WITH MASS AMPLIFICATION

(75) Inventors: Thomas Manfredotti, La Colle sur Loup (FR); Julien Caillet, Les Pennes Mirabeau (FR)

(73) Assignee: Airbus Helicopters, Marignange Cedex (FR)

( * ) Notice: Subject to any disclaimer, the term of this patent is extended or adjusted under 35 U.S.C. 154(b) by 974 days.

(21) Appl. No.: 12/835,825

(22) Filed: Jul. 14, 2010

(65) Prior Publication Data

US 2011/0020592 A1 Jan. 27, 2011

(30) Foreign Application Priority Data

Jul. 21, 2009 (FR) ...................................... 09 03583

(51) Int. Cl.
*F16M 9/00* (2006.01)
*F16F 7/10* (2006.01)

(52) U.S. Cl.
CPC ........................................ *F16F 7/10* (2013.01)
USPC ............ 267/136; 181/207; 181/209; 428/99; 428/137; 428/178

(58) Field of Classification Search
USPC ............... 267/90, 42, 43, 292, 136, 141, 147, 267/160–163, 181; 181/207, 208, 209, 210, 181/284, 286, 288, 292; 428/99, 137, 178, 428/72–74
See application file for complete search history.

(56) References Cited

U.S. PATENT DOCUMENTS

| 3,153,304 | A | * | 10/1964 | Evangelista | .................... 52/144 |
| 4,353,433 | A | * | 10/1982 | Mohrenstein-Ertel et al. | .............................. 181/207 |
| 4,456,092 | A | * | 6/1984 | Kubozuka et al. | ............ 181/290 |
| 7,267,196 | B2 | * | 9/2007 | Mathur | ......................... 181/208 |
| 7,553,533 | B2 | * | 6/2009 | Manfredotti | .................. 428/134 |
| 8,282,085 | B2 | * | 10/2012 | Manfredotti | .................. 267/136 |
| 2002/0108807 | A1 | * | 8/2002 | Murakami et al. | ............ 181/204 |
| 2006/0246257 | A1 | * | 11/2006 | Manfredotti | .................. 428/137 |
| 2008/0145621 | A1 | * | 6/2008 | Manfredotti | .................. 428/178 |

FOREIGN PATENT DOCUMENTS

| CN | 100412408 | C | 8/2008 |
| CN | 100587289 | C | 2/2010 |
| FR | 2870308 | A1 | 11/2005 |
| FR | 2909740 | A1 | 6/2008 |

(Continued)

OTHER PUBLICATIONS

Chinese Office Action Dated Sep. 2, 2013, Application No. 201010536926.4, Applicant Eurocopter, 8 Pages.

(Continued)

*Primary Examiner* — Thomas Irvin
(74) *Attorney, Agent, or Firm* — Brooks Kushman P.C.

(57) ABSTRACT

An insulating coating (1) with high damping power and suitable for being fastened to a structure (2). The coating comprises a dissipater mesh made up of a plurality of dissipater elements (3) and of nodes (4) with the bottom end (4') of each node being fastened to said structure (2). Each dissipater element is secured to first and second nodes (6, 7). The bottom ends (4') of said nodes (4) project from said dissipater elements (3) so as to be suitable for creating an empty space (5) between the dissipater elements (3) and said structure (2). In addition, at least one dissipater element (3) is provided with at least one branch (10, 20) provided with a heavy element (30, 31, 32). The heavy element (30, 31, 32) has a first mass that is greater than or equal to a second mass of said branch (10, 20).

20 Claims, 2 Drawing Sheets

(56) References Cited

FOREIGN PATENT DOCUMENTS

| | | | |
|---|---|---|---|
| GB | 2265669 | A | 6/1993 |
| GB | 2265669 | A | 10/1993 |
| JP | 2006299553 | A | 11/2006 |
| JP | 2003246913 | A | 9/2009 |
| SU | 1240973 | A1 | 6/1986 |

OTHER PUBLICATIONS

Search Report and Written Opinion; Application No. FR 09 03583; dated Mar. 23, 2010.

* cited by examiner

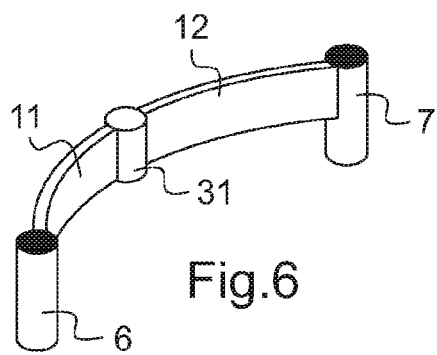
Fig.6
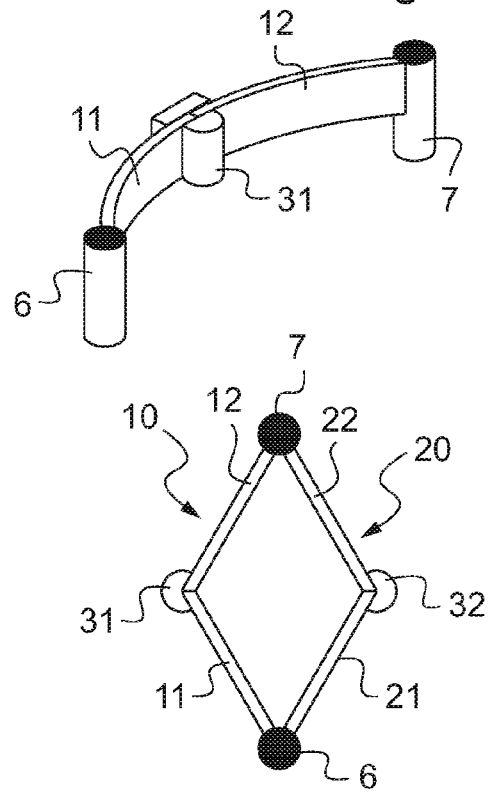
Fig.7
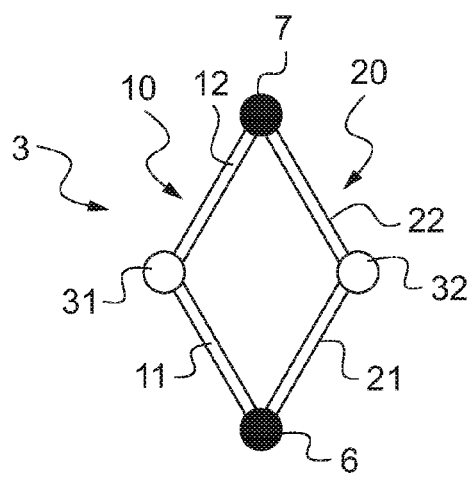
Fig.8
Fig.9
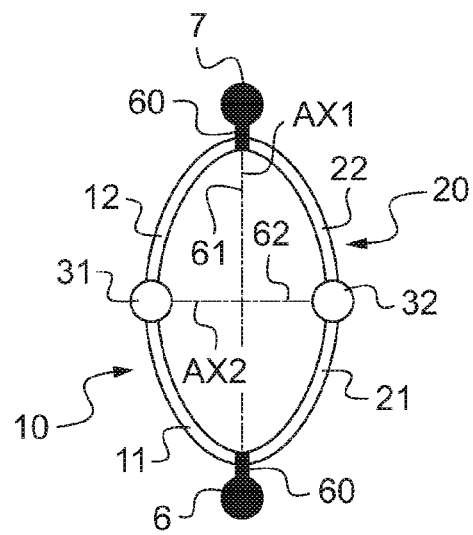
Fig.10
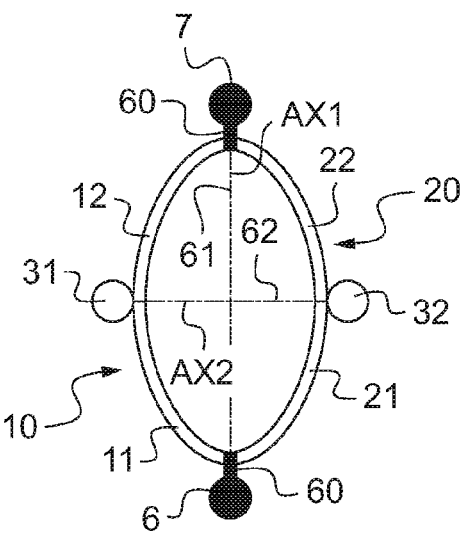
Fig.11

US 8,876,091 B2

INSULATING COATING WITH MASS AMPLIFICATION

CROSS REFERENCE TO RELATED APPLICATION

This application claims the benefit of FR 09 03583 dated Jul. 21, 2009, the disclosure of which is incorporated herein by reference.

FIELD OF THE INVENTION

The present invention relates to an insulating coating with mass amplification that serves to reduce or even eliminate the dynamic deformation of a structure as generated by vibration or by impacts, for example.

More particularly, the insulating coating of the invention is preferably intended for mounting on board a rotorcraft. By being installed in particular on the walls of its cabin, the insulating coating attenuates the dynamic deformation of the walls so as to increase their lifetime and reduce the noise inside the cabin.

Naturally, the invention is not limited to this particular application and it may be used in any other application where it is desirable to reduce the dynamic deformation of a body. Given its design, it is optionally possible to envisage arranging the insulating coating on the walls of a washing machine, for example, since this type of electrical appliance is subjected to high levels of vibration.

BACKGROUND OF THE INVENTION

In a first known method of reducing the vibration of a structure, and thus the noise transmitted by said structure, an additional heavy plate, e.g. based on lead, is placed against the structure so as to improve the vibratory and/or sound insulation of said structure by the mass effect.

That first method is very effective but it presents the drawback of being heavy. That drawback is a major drawback in the field of aviation, where weight always needs to be optimized.

In a second method, the vibration, and thus the noise generated by a structure, is reduced by providing damping that serves to dissipate the vibratory energy, converting it into heat.

A first system implementing that second method consists in a monolithic plate of elastomer arranged on the structure. The damping power of the elastomer then reduces the dynamic deformation of the structure, whatever the mode of the mechanical stress to which it is subjected, and in particular it dissipates energy in the form of heat.

Compared with the first method, the saving in terms of weight is considerable, since elastomer is not very heavy. Nevertheless, the efficiency of that first system is limited since oscillation of the structure gives rise only to small movements in the elastomer. Thus, energy dissipation in the elastomer plate is weak.

To improve that first system, it is common practice to use a second system. The second system comprises a visco-constrained elastomer, i.e. an elastomer plate having its top portion previously bonded to a metal support. The bottom portion of the elastomer plate, opposite from its top portion, is then fastened to a structure.

During dynamic deformation, e.g. bending of the structure as generated by vibration, the top face is held by the metal support. That additional condition at the limits induces a state of internal stresses in the elastomer that is greater than the above-described system. Consequently, the amount of vibratory energy that is dissipated in the elastomer plate is increased.

The second system is certainly more efficient than the first system. Nevertheless, for applications that require a large amount of vibratory energy to be dissipated, it is found to be still insufficient. Furthermore, it can turn out to be heavy.

Document FR 2 870 308 discloses a third damper system.

The absorbent coating of FR 2 870 308 is fastened to a structure and is provided with an absorbent layer of an elastic material that includes a dissipater mesh. The mesh is arranged in the elastic material and is constituted by a plurality of nodes and of dissipater elements.

In such a device, the vibratory energy that is absorbed is dissipated mainly in the form of heat by deforming material.

The energy dissipation in the absorbent layer is considerable since the elastic material of the absorbent layer is deformed both by a lever arm effect caused by the nodes that hold the dissipater elements apart from the structure, and by the dissipater elements that cause the stresses that are transmitted by the nodes to be spread throughout all of the elastic material, while amplifying them by a geometrical effect.

That system is very effective, but the absorbent layer represents a weight that is not negligible.

Finally, document FR 2 909 740 presents a fourth damper system. Document FR 2 909 740 provides an absorbent coating having high damping power, the coating comprising a dissipater mesh made up of a plurality of dissipater elements and of nodes, the bottom end of each node being fastened to the structure. That coating is remarkable in that the bottom end of each node projects relative to the dissipater elements so as to create an empty space between the dissipater elements and the structure, so that the absorbent coating is provided with main absorbent elements that are arranged in said empty space, these main absorbent elements being secured firstly to the bottom face of the dissipater elements and secondly to the structure.

The performance of the absorbent coating is very advantageous. Nevertheless, it is found that it is difficult to mass produce, thereby sometimes making it awkward to use.

SUMMARY OF THE INVENTION

An object of the present invention is thus to provide an insulating coating that is relatively lightweight, and that enables the dynamic deformation of a structure to be damped to a considerable extent, while nevertheless being easy to produce.

According to the invention, an insulating coating with high damping power suitable for being fastened to a structure, comprises a dissipater mesh made up of a plurality of dissipater elements and of nodes with the bottom end of each node being fastened to the structure, each dissipater element being secured to first and second nodes, the bottom ends of the nodes projecting from the dissipater elements so as to be suitable for creating an empty space between the dissipater elements and the structure.

This insulating coating is remarkable in that at least one dissipater element is provided with at least one branch having at least one segment and a heavy element fastened to said at least one segment, said heavy element having a first mass that is greater than or equal to a second mass of said at least one segment. Under such circumstances, the branch has a total mass that is equal to the sum of the first and second masses.

Advantageously, the second mass is practically negligible compared with the first mass.

Such an insulating coating transmits only a small fraction of the incident vibratory energy since a large fraction is reflected back towards the source and a large fraction is also dissipated mechanically, as opposed to thermally as in document FR 2 870 308.

Thus, the invention goes against the prejudices that consist in thinking that vibratory and/or sound insulation of a structure by the mass effect leads to using a coating that is particularly heavy.

An original movement of the nodes leads geometrically to an amplified movement of the heavy element arranged on the dissipater element in question, with an amplification ratio ρ for the dissipater element.

Under such circumstances, if the nodes are subjected to an excitation X at a frequency W, then the heavy element of mass m generates a first force F1 equal to:

$$F1 = \rho * X * m * W^2$$

where "*" represents the multiplication sign.

Furthermore, this first force F1 generated by the heavy element is transmitted to the nodes while also being amplified by the ratio ρ. Consequently, the dynamic force F2 recovered at the first and second nodes is also amplified by the amplification ratio ρ of the dissipater element, i.e.:

$$F2 = \rho^2 * X * m * W^2$$

where "*" represents the multiplication sign.

Consequently, a heavy element of mass m used on an insulating coating of the invention enables vibratory and/or sound insulation to be generated that is at least equivalent to a conventional element of mass M that is equal to the product of the mass m of the heavy element multiplied by the amplification ratio ρ raised to the second power. For convenience, such a coating is referred to as an "amplified mass insulating coating", the mass of the heavy element being, so to speak, amplified by the branch of the dissipater element.

In addition, it is found that such an insulating coating is easily fabricated, thereby making it possible to envisage using it on a large scale, which is an excellent result.

The coating may also include one or more of the following additional characteristics.

For example, said heavy element is made of the same material as said at least one segment but occupies a first volume that is greater than a second volume that is occupied by said at least one segment. Since the first volume occupied by the heavy element is greater than the second volume occupied by the segment(s) of the associated branch, the first mass is greater than the second mass.

Optionally, in a variant, said heavy element is made from a first material and said at least one segment of the associated branch of a dissipater element is made from a second material, said first and second materials being different.

For example, the first material is selected from materials that are particularly heavy, such as an alloy of carbon and tungsten known under the trademark Inermet®.

In contrast, since the segments of a branch of a dissipater element are rigid and are used in their elastic deformation domain, the second material forms part of the group of materials constituted by so-called "plastics" materials.

Under such circumstances, the first material has a first density that is advantageously greater than a second density of the second material.

Furthermore, a heavy element of a branch may be arranged against first and second segments of said associated branch. More specifically, it is conceivable for a heavy element to be arranged between first and second segments of a branch.

Consequently, the first segment of a branch is fastened both to a first node and to a heavy element, with the second segment of the same branch being fastened to a second node and to said second element.

Since each branch has first and second segments, the first and second segments are optionally identical in length in order to optimize the amplification ratio of the branch of the dissipater element.

In addition, in a first variant, with each branch having first and second segments, the first and second segments are rectilinear, and are thus straight bars.

In a second variant, said branch has first and second segments, and each of said first and second segments represent one-fourth of an ellipse.

In a first embodiment, each dissipater element has a single branch, made in accordance with the first or the second variant, for example.

In contrast, in a preferred, second embodiment, each dissipater element comprises first and second branches, the first branch being provided with a first heavy element, the second branch being provided with a second heavy element, and each branch connecting together a first node and a second node.

Thus, the first segment of the first branch is fastened to the first node, the second segment of the first branch being fastened to the second node. The first heavy element of the first branch is then arranged against the first and second segments of said first branch, and optionally between the first and second segments of said first branch.

Similarly, the first segment of the second branch is fastened to the first node, the second segment of the second branch being fastened to the second node. The second heavy element of the second branch is then arranged against the first and second segments of said second branch, and optionally between the first and second segments of said second branch.

By applying the first variant to the second embodiment, the dissipater element comprises first and second branches together forming a deformable parallelogram, with the first and second nodes fastened to two first opposite vertices of the deformable parallelogram and with first and second heavy elements being arranged at the other two opposite vertices.

Advantageously, the first and second segments of each of the branches are equal in length. Furthermore, the first segment of the first branch is parallel to the second segment of the second branch and the second segment of the first branch is parallel to the first segment of the second branch, thereby giving the dissipater a lozenge shape.

By applying the second variant to the second embodiment, the dissipater element has first and second branches that together form an ellipse, the first branch being provided with a first heavy element and the second branch being provided with a second heavy element, the first and second nodes being situated on a first axis containing the major axis of the resulting ellipse, and the first and second heavy elements being arranged on a second axis containing the minor axis of the ellipse.

BRIEF DESCRIPTION OF THE DRAWINGS

The invention and its advantages appear in greater detail from the following description of embodiments given by way of illustration and with reference to the accompanying figures, in which:

FIGS. 6 and 7 show a dissipater element in a second variant of a first embodiment;

FIGS. 8 and 9 show a dissipater element in a first variant of the second embodiment; and FIGS. 10 and 11 show a dissipater element in a second variant of a second embodiment.

Elements shown in more than one of the figures are given the same references in each of them.

DETAILED DESCRIPTION OF THE PREFERRED EMBODIMENT

Figure 1:
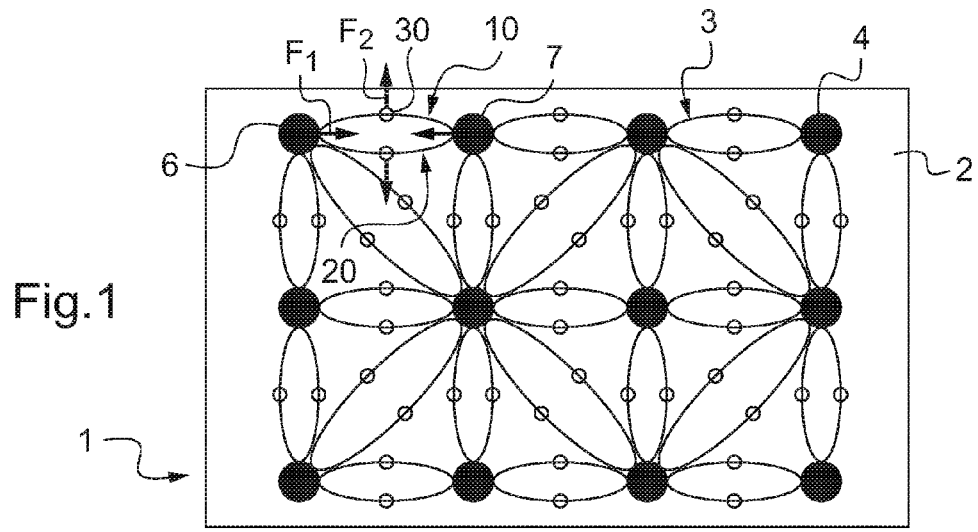
FIG. 1 is a plan view of an insulating coating in a preferred second embodiment.

FIG. 1 shows an amplified mass insulating coating 1 arranged on a structure 2.

The insulating coating 1 comprises a layer including a dissipater mesh made up of a plurality of nodes 4 and of dissipater elements 3.

Independently of the embodiment, each branch 10, 20 is provided with a heavy element 30 made of a first material.

In addition, for each dissipater element comprising at least one segment connecting first and second nodes 6 and 7 together, this at least one segment is constituted by a second rigid material selected from the group of so-called "plastics" materials, that is advantageously distinct from the first material of the associated heavy element.

Nevertheless, in a variant, the first and second materials could be identical.

Figure 2:
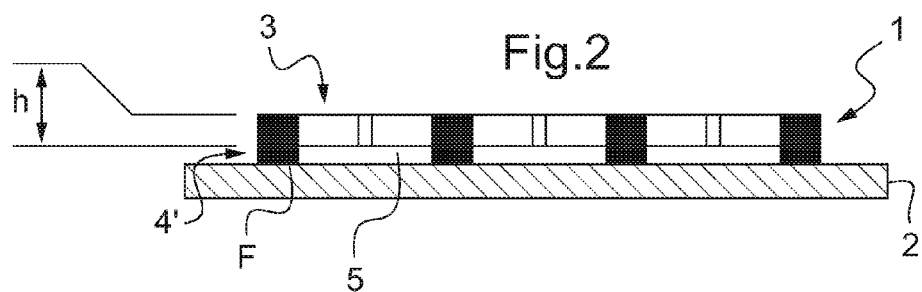
FIG. 2 is a section view of the insulating coating in a preferred second embodiment.

With reference to FIG. 2, the insulating coating 1 is fastened on a structure 2.

To do this, the ends 4' of each node 4 project relative to the dissipater elements 3. Under such circumstances, their bottom faces F are bonded to the structure 20, e.g. by adhesive or by screw-fastening, so as to hold the dissipater elements 3 away from the structure 2 by leaving an empty space 5 between the dissipater elements 3 and the structure 2.

In order to make it easier to mount the insulating coating on the structure 2, the bottom face F of each end 4' is covered in an adhesive material. It should be observed that such mounting is particularly easy to perform. Thus, the insulating coating 1 may be installed on any type of existing wall, e.g. the ceiling of a rotorcraft cabin, without any particular extra expense.

Furthermore, the branch(es) 10, 20, and the heavy elements 30 of the dissipater elements 3 together constitute a single dissipating layer of height h that is relatively low. The insulating coating 1 is therefore relatively compact, which means that it may be mounted on a structure even if the structure is in a restricted space.

Furthermore, FIG. 1 shows a dissipater mesh having a repeated square pattern comprising four nodes 4 and four dissipater elements 3 that represent respectively the corners and the sides of a square. In addition, a fifth dissipater element is disposed along one of the diagonals of the square.

Figure 3:
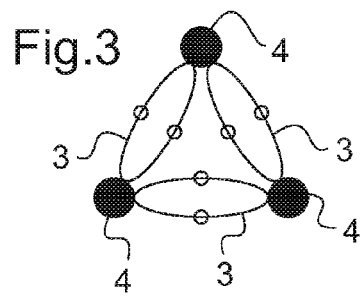
FIG. 3 is a plan view of a triangular pattern of a dissipater mesh of an insulating coating in a preferred second embodiment.

As shown in FIG. 3, the repeated pattern of the dissipater mesh may be triangular, with three nodes 4 and three dissipater elements 3 then representing respectively the corners and the sides of a triangle.

From a functional point of view, when the structure 2 is deformed under the effect of vibration, and whatever the mode in which it is stressed (traction, bending, . . . ), the nodes 4 move, thereby leading to deformation of the dissipater elements.

Geometrically, the movement along the second arrow F2 of the heavy elements 30 is amplified by the associated branch 10, 20 with an amplification ratio ρ generated by the shape of said branch 10, 20 relative to the movement along the first arrow F1 of the corresponding first and second nodes 6 and 7.

Thus, an excitation X of frequency W at the first and second nodes 6 and 7 gives rise in return to a heavy element 30 creating a first force F1 equal to:

$$F1 = \rho * X * m * W^2$$

where "*" represents the multiplication sign and "m" represents the mass of the heavy element.

This first force F1 generated by the heavy element is then transmitted to the first and second nodes, being simultaneously amplified by the amplification ratio ρ. Consequently, the dynamic force F2 recovered at the first and second nodes is equal to the first force F1 amplified by the amplification ratio ρ of the dissipater element, i.e.:

$$F2 = \rho^2 * X * m * W^2$$

where "*" represents the multiplication sign.

The invention thus serves to amplify the mass of a heavy element, and thus optimize the mass of an insulating coating 1. The combined effect of the dissipater elements 3 and the nodes 2 thus imparts strong dissipative power to the insulating coating 1 by means of the mass effect without it being necessary to implement an insulating coating of large mass.

For equivalent performance, a conventional mass effect insulating coating has a total mass equal to the product of the total mass of the invention multiplied by the amplification ratio ρ of its dissipater elements raised to the power two.

Thus, the first mass of the heavy element is advantageously greater than the second mass of all of the segments of the associated branch in order to optimize the effectiveness of the coating 1.

In the first and second embodiments shown in FIGS. 4 to 11, a dissipater element 3 is provided with at least one branch 10, 20 going from a first node 6 to a second node 7.

Said at least one branch 10, 20 is provided with first and second segments 11, 12 against which there is arranged a heavy element 30, and possibly between which there is arranged the heavy element 30. Advantageously, these first and second segments are identical and thus present the same length.

Consequently, the heavy element 30 is situated halfway between the first and second nodes 6 and 7, thereby maximizing the amplification ratio ρ of the dissipater element 3.

In the first embodiment shown in FIGS. 4 to 7, a dissipater element 3 is provided with a single branch 10 going from a first node 6 to a second node 7.

Figure 4:
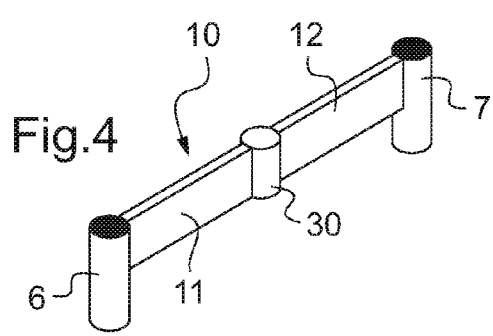
FIGS. 4 and 5 show a dissipater element in a first variant of a first embodiment.
Figure 5:
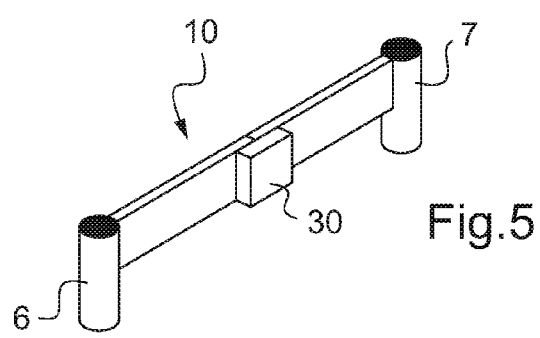

More precisely, in a first variant of the first embodiment shown in FIGS. 4 and 5, each single branch 10 is provided with first and second segments 11 and 12 that are rectilinear.

With reference to FIG. 4, the heavy element 30 is arranged between the first and second segments 11 and 12. Consequently, the first segment 11 is secured to the first node 6 and to the heavy element 30, while the second segment 12 is secured to the second node 7 and to said heavy element 30.

With reference to FIG. 5, the heavy element 30 is arranged against the first and second segments 11 and 12. Under such circumstances, the first segment 11 is secured to the first node 6 and to the second segment 12, said second segment 12 also being secured to the second node 7.

The heavy element 30 is then preferably fastened halfway between the first and second nodes 6 and 7. Since the first and second segments 11 and 12 are identical, the heavy element 30 is fastened jointly to both the first and the second segments 11 and 12.

It can be understood that these first and second segments may constitute a single mechanical segment that is machined from a single block.

In a second variant of the first embodiment, as shown in FIGS. 6 and 7, each single branch 10 is of semi-elliptical shape and is provided with first and second segments 11 and 12 each representing one-fourth of an ellipse.

With reference to FIG. 6, the heavy element 30 is arranged between the first and second segments 11 and 12. However, with reference to FIG. 7, the heavy element 30 is arranged against the first and second segments 11 and 12, the first and second segments 11 and 12 being in contact with each other in such a manner as to form a half-ellipse, i.e. half of an ellipse that has been divided along its major axis.

The heavy element 30 is then preferably fastened to the single branch 10 halfway between the first and second nodes 6 and 7. Since the first and second segments 11 and 12 are identical, the heavy element 30 is fastened jointly to both the first and the second segments 11 and 12.

The first and second nodes 6 and 7 are located at the intersections between the periphery of the half-ellipse and the major axis of said half-ellipse.

In a second embodiment shown in FIGS. 8 to 11, a dissipater element 3 is provided with first and second branches 10, 20 going from a first node 6 to a second node 7.

More precisely, in a first variant of the second embodiment shown in FIGS. 8 and 9, each single branch 10 is provided with first and second rectilinear segments 11 and 12.

With reference to FIG. 8, the first heavy element 31 of the first branch 10 is arranged between the first and second segments 11 and 12 of said first branch 10. Consequently, the first segment 11 of the first branch 10 is secured to the first node 6 and to the first heavy element 31, while the second segment 12 of the first branch 10 is secured to the second node 7 and to said first heavy element 31. Similarly, the first segment 21 of the second branch 20 is secured to the first node 6 and to the second heavy element 32, while the second segment 22 of the second branch 20 is secured to the second node 7 and to the second heavy element 32.

The dissipater element 3 shown is then in the form of a deformable parallelogram, the first and second nodes 6 and 7 being fastened to two first opposite vertices of the deformable parallelogram, with the first and second heavy elements 31 and 32 being arranged at the other two opposite vertices.

In addition, the first segment 11 of the first branch 10 is parallel to and of length identical to the second segment 22 of the second branch 20, with the second segment 12 of the first branch 10 being parallel to and of length identical to the first segment 21 of the second branch 20. The dissipater element 3 is therefore lozenge-shaped.

With reference to FIG. 9, the first and second heavy elements 31 and 32 may be arranged against the first and second segments 11, 21 and 12, 22 of the first and second branches 10 and 20 without being disposed between the first and second segments 11 and 12 of the associated first and second branches 10 and 20. Under such circumstances, the first segment 11 is secured to the first node 6 and to the second segment 12, with said second segment 12 then also being secured to the first node 7.

It can be understood that these first and second segments in a given branch may be constituted by a single mechanical member machined from a single block.

In a second variant of the second embodiment as shown in FIGS. 10 and 11, the first and second branches 10, 20 are semi-elliptical in shape and each of them is provided with first and second segments 11 and 12, 21 and 22 each occupying one-fourth of an ellipse.

With reference to FIG. 10, first and second heavy elements 31 and 32 are arranged between the first and second segments 11 and 12, 21 and 22 respectively of the first and second branches 10 and 20.

However, with reference to FIG. 11, first and second heavy elements 31 and 32 are arranged against the first and second segments 11 and 12, 21 and 22 respectively of the first and second branches 10 and 20, the first and second segments 11 and 12, 21 and 22 of each branch being in contact with each other so as to form a half-ellipse, i.e. half of an ellipse that is divided on its major axis.

Each heavy element is then preferably fastened to a branch halfway between the first and second nodes 6 and 7. Since the first and second segments 11 and 12 are identical, a heavy element 30 is fastened together to the first and second segments 11 and 12.

The first and second nodes 6 and 7 are arranged at the intersections between the periphery of the half-ellipse and the major axis of said half-ellipse.

Consequently, in the preferred, second embodiment, the dissipater element 3 is elliptical in shape. The first and second nodes 6 and 7 are then situated on a first axis AX1 containing the major axis of the ellipse, with the first and second heavy elements 31 and 32 being arranged on a second axis AX2 containing the minor axis of the ellipse.

More precisely, the first and second nodes 6 and 7 may constitute the intersection between the periphery of said ellipse and its major axis, or they may be connected to said intersection by a link member 60.

In this way, the efficiency of the insulating coating 1 of the invention is optimized. Because of the shape of an ellipse, a small reduction in the size of the major axis 61 of the dissipater element 3 gives rise to a large increase in the size of the small axis 62 of said elliptically-shaped dissipater element. Thus, weak stressing of the ellipse along its major axis 11 is strongly amplified giving rise to a large amount of movement of the heavy elements situated on the second axis AX2.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. An insulating coating with high damping power suitable for being fastened to a structure, the coating comprising:
   a dissipater mesh made up of a plurality of dissipater elements and a plurality of nodes with a bottom end of each node being fastened to the structure, each dissipater element extending between and directly secured to first and second nodes, wherein each dissipater element is provided with at least one branch,
   a plurality of heavy elements, wherein each branch individually supports a separate one of the plurality of heavy elements, each heavy element having a first mass that is greater than or equal to a second mass of each branch,
   wherein the plurality of nodes project to suspend the branches and heavy elements, above the structure such that the dissipater mesh attenuates the dynamic deformation of the structure generated by vibrations.

2. The insulating coating according to claim 1, wherein the plurality of heavy elements are formed of the same material as the associated dissipater branch, each separate heavy element having a first volume that is greater than a second volume of the branch on which each separate heavy element is supported.

3. The insulating coating according to claim 1, wherein each separate heavy element heavy element includes a first material and the associated dissipater branch is made from a second material, the first and second materials being different.

4. The insulating coating according to claim 3, wherein the first material has a first density that is greater than a second density of the second material.

5. The insulating coating according to claim 1, wherein each dissipater branch has first and second segments, wherein each separate heavy element is arranged against first and second segments of the associated branch.

6. The insulating coating according to claim 1, wherein each dissipater branch has first and second segments, wherein each separate heavy element is arranged between first and second segments of the associated branch.

7. The insulating coating according to claim 1, wherein each dissipater branch has first and second segments, and the first and second segments are of identical length.

8. The insulating coating according to claim 1, wherein the dissipater element comprises first and second branches together forming a deformable parallelogram, the first and second nodes being fastened to two opposite first vertices of the deformable parallelogram, the first branch being provided with a first separate heavy element, the second branch being provided with a second separate heavy element, and first and second separate heavy elements being arranged at the other two opposite vertices.

9. The insulating coating according to claim 1, wherein the dissipater element comprises first and second branches together forming an ellipse, the first branch being provided with a first separate heavy element, the second branch being provided with a second separate heavy element, and the first and second nodes being situated on a first axis containing a major axis of the ellipse, with the first and second separate heavy elements being arranged on a second axis containing a minor axis of the ellipse.

10. The insulating coating according to claim 1, wherein each of the plurality of nodes is connected to at least two adjacent nodes, and wherein at least one dissipater branch is directly connected to the each of the least two adjacent nodes.

11. An insulating mesh coating for damping vibrations, the mesh coating comprising:
   a plurality of nodes adapted for being fastened to a structure; and
   a plurality of dissipating elements connecting the plurality of nodes, each dissipating element including:
      at least one dissipating branch extending between each pair of adjacent nodes and directly connected to each of the adjacent nodes; and
      a plurality of heavy elements, wherein each branch supports a separate one of the plurality of heavy elements, the heavy element having a first mass that is greater than or equal to a second mass of the at least one branch,
   wherein a node height is greater than a height of the dissipating elements to create an empty space between the dissipating element and the structure, such that the dissipater mesh coating attenuates the dynamic deformation of the structure generated by vibrations.

12. The insulating mesh coating according to claim 11, wherein each dissipating branch has first and second segments, wherein each separate heavy element is arranged between first and second segments of the branch.

13. The insulating mesh coating according to claim 12, wherein the first and second segments have a length being generally the same.

14. The insulating mesh coating according to claim 12, wherein each of the first and second segments defines one-fourth of an ellipse.

15. The insulating mesh coating according to claim 11, wherein the dissipater element includes first and second branches, the first branch being provided with a first separate heavy element, the second branch being provided with a second separate heavy element, and each of the first and second branch being directly connected between the pair of adjacent nodes.

16. The insulating mesh coating according to claim 15, wherein the each of the first and second branches are shaped to form a deformable parallelogram, the pair of adjacent nodes being fastened to two opposite first vertices of the deformable parallelogram, and first and second separate heavy elements being arranged at the other two opposite vertices.

17. The insulating mesh coating according to claim 15, wherein the first and second branches are shaped to form an ellipse, and the pair of adjacent nodes being situated on a first axis containing a major axis of the ellipse, with the first and second separate heavy elements being arranged on a second axis containing a minor axis of the ellipse.

18. The insulating mesh coating according to claim 11, wherein the plurality of nodes include at least four nodes, wherein the four nodes are interconnected by the plurality of dissipater elements without overlapping any of the dissipating branches.

19. An insulating mesh coating for damping vibrations, the mesh coating comprising:
   a plurality of nodes adapted for being fastened to a structure;
   a plurality of dissipating branches extending between the plurality of nodes, wherein at least two dissipating branches are directly connected between each pair of adjacent nodes; and
   a plurality of heavy elements, wherein each branch supports a separate one of the plurality of heavy elements, each heavy element having a first mass that is greater than a second mass of the corresponding branch,
   wherein the plurality of nodes project above the structure to suspend the plurality of dissipating branches and plurality of heavy elements above the structure, such that the dissipater mesh coating attenuates the dynamic deformation of the structure generated by vibrations.

20. The insulating mesh coating according to claim 19, wherein the each of the plurality of nodes is connected to at least two adjacent nodes, and wherein at least two dissipating branches are directly connected to the each of the least two adjacent nodes.

* * * * *